(12) United States Patent
Zhou et al.

(10) Patent No.: US 12,425,344 B2
(45) Date of Patent: Sep. 23, 2025

(54) SYSTEMS AND METHODS FOR NETWORK FLOW REORDERING

(71) Applicant: Fortinet, Inc., Sunnyvale, CA (US)

(72) Inventors: Xu Zhou, Sunnyvale, CA (US); Yuan-Heng Chao, Fremont, CA (US)

(73) Assignee: Fortinet, Inc., Sunnyvale, CA (US)

(*) Notice: Subject to any disclaimer, the term of this patent is extended or adjusted under 35 U.S.C. 154(b) by 313 days.

(21) Appl. No.: 18/072,970

(22) Filed: Dec. 1, 2022

(65) Prior Publication Data

US 2024/0187343 A1 Jun. 6, 2024

(51) Int. Cl.
*H04L 47/125* (2022.01)
*H04L 47/62* (2022.01)

(52) U.S. Cl.
CPC ........ *H04L 47/125* (2013.01); *H04L 47/6245* (2013.01)

(58) Field of Classification Search
None
See application file for complete search history.

(56) References Cited

U.S. PATENT DOCUMENTS 11,128,561 B1* 9/2021 Matthews ........... H04L 43/0882
2016/0373380 A1* 12/2016 Nagayama .............. H04L 43/16

* cited by examiner

*Primary Examiner* — Schquita D Goodwin
*Assistant Examiner* — Ishrat Rashid
(74) *Attorney, Agent, or Firm* — Jaffery Watson Hamilton DeSanctis LLP (57) ABSTRACT

Various embodiments provide systems and methods for reordering processed network traffic.

20 Claims, 6 Drawing Sheets

SYSTEMS AND METHODS FOR NETWORK FLOW REORDERING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for processing and/or transferring network traffic, and more particularly to systems and methods for reordering processed network traffic.

BACKGROUND

In Ethernet based communication networks, packets delivered out-of-order negatively impacts performance. In TCP protocol, excessive number of packets received out-of-order result in packet retransmission similar to how dropped packets are handled. To achieve optimal performance, it is highly desirable for a network device to guarantee that egress packets retain original packet ordering on a per flow basis as defined by TCP/IP connection 5-tuple. The problem of assuring packet order is trivial where there is only a single processing thread, however, processing network traffic as a single processing thread greatly limits throughput.

To meet future performance demands it is likely that a parallel processing environment supporting multiple processing threads will be required, and use of such parallel processing environments greatly increases the complexity of assuring packets are delivered in a desired order. Further, the ability to assure packet order becomes vastly more complex than a corresponding single thread processing environment. In some cases, the logic size of the reordering logic may even exceed the size of the parallel processing engines when implemented on the same ASIC hardware. The problems surrounding reordering are further amplified in a multicast scenario where a given processing engine is expected to selectively duplicate then modify packets according to multicast and mirroring.

For any of the above reasons and/or other reasons, there exists a need in the art for advanced approaches for packet reordering.

SUMMARY

Various embodiments provide systems and methods for reordering processed network traffic.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for reordering processed network traffic.

Embodiments of the present disclosure include various processes, which will be described below. The processes are described as being performed by semiconductor circuitry, but in some cases some or all of the processes may be implemented in machine-executable instructions, which may be used to cause a general-purpose or special-purpose processor programmed with the instructions to perform the steps. In particular embodiments, the processes are performed by an application specific integrated circuit (ASIC) that is configured to perform the described processes.

Embodiments may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Other embodiments may be provided as an ASIC. Yet other embodiments may be provided as a hybrid between an ASIC which performs part of the processes, a general purpose processor, and a computer program product, which may include a machine-readable storage medium tangibly embodying thereon instructions, which may be used to program the general purpose processor (or other electronic devices) to perform one or more of the processes.

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned.

Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The term "circuit" is used in its broadest sense to mean any circuit including a number of transistors that operate together to perform a particular function or process. Based upon the disclosure provided herein, one of ordinary skill in the art will recognize a variety of circuits and/or circuit types that may be used in relation to different embodiments.

Example embodiments will now be described more fully hereinafter with reference to the accompanying drawings. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide systems for transferring network traffic. Such systems include: a first first-in/first-out (FIFO) memory circuit, a second FIFO memory circuit, a controller, a first processing engine, and a second processing engine. The controller is configured to designate the first processing engine for processing a first series of network traffic packets and designating the second processing engine for processing a second series of network traffic packets. The first series of network traffic packets are unicast packets, and the second series of network traffic packets are multicast traffic packets. A first identifier of one of the first series of network traffic packets is loaded into the first FIFO, a second identifier of another one of the first series of network traffic packets is loaded into the first FIFO after the first identifier, a third identifier of one of the second series of network traffic packets is loaded into the first FIFO, and a fourth identifier of another one of the second series of network traffic packets is loaded into the second FIFO. The one of the first series of network traffic packets corresponding to the first identifier is designated for processing by the first processing engine before the one of the first series of network traffic packets corresponding to the second identifier is designated for processing by the first processing engine. The one of the second series of network traffic packets corresponding to the third identifier is designated for processing by the second processing engine before the one of the first series of network traffic packets corresponding to the fourth identifier is designated for processing by the second processing engine.

In some instances of the aforementioned embodiments, the system further includes an output module that is configured to output any of the second series of network traffic packets with an identifier in the first FIFO before outputting any other of the second series of network traffic packets with an identifier in the second FIFO. In some cases, the output module is an application specific integrated circuit. In various cases all of the output module, the first FIFO memory circuit, the second FIFO memory circuit, the first processing engine, the second processing engine, and the controller are implemented in the same application specific integrated circuit.

In various instances of the aforementioned embodiments, the system further includes: a third processing engine, where the controller is configured to designate the third processing engine for processing the second series of network traffic packets. In such instances, a fifth identifier of one of the second series of network traffic packets designated for processing by the third processing engine is loaded into the first FIFO, and a sixth identifier of another one of the second series of network traffic packets designated for processing by the third processing engine is loaded into the second FIFO. The one of the second series of network traffic packets corresponding to the fifth identifier is designated for processing by the third processing engine before the one of the second series of network traffic packets corresponding to the sixth identifier is designated for processing by the third processing engine.

In some cases, the aforementioned instances further include an output module. The output module is configured to output the network traffic packet corresponding to the third identifier in the first FIFO before outputting the network traffic packet corresponding to the fourth identifier in the second FIFO; and the output module is configured to output the network traffic packet corresponding to the fifth identifier in the first FIFO before outputting the network traffic packet corresponding to the sixth identifier in the second FIFO. In some such cases, the output module is configured to output the network traffic packet corresponding to the fourth identifier in the second FIFO before outputting the network traffic packet corresponding to the fifth identifier in the first FIFO. In various such cases, the output module is configured to output the network traffic packet corresponding to the fifth identifier in the first FIFO before outputting the network traffic packet corresponding to the fourth identifier in the second FIFO.

In various instances of the aforementioned embodiments, all of the first FIFO memory circuit, the second FIFO memory circuit, the first processing engine, and the second processing engine are implemented in the same application specific integrated circuit. In other instances of the aforementioned embodiments, the controller is implemented as a general purpose processor and a non-transient computer readable medium. The aforementioned non-transient computer readable medium includes instructions executable by the general purpose processor to: designate the first processing engine for processing a first series of network traffic packets and designate the second processing engine for processing a second series of network traffic packets. In various instances of the aforementioned embodiments, the controller is a load balancer that operates to balance loads performed by at least the first processing engine and the second processing engines.

Other embodiments provide methods for transferring network traffic that include receiving in order, by a controller, a first packet of network traffic, a second traffic of network traffic, a third packet of network traffic, and a fourth packet of network traffic; where the first packet and the fourth packet are part of a first series of network traffic; where the first series of network traffic are unicast packets; where the second packet and the third packet are part of a second series of network traffic; and where the second series of network traffic are multicast packets. The methods further include designating in order, by the controller, the first packet of network traffic to be processed by a first processing engine, the second packet of network traffic to be processed by a second processing engine, the third packet of network traffic to be processed by the second processing engine, and the fourth packet of network traffic to be processed by a first processing engine. The methods further include loading a first identifier corresponding to the first packet into a first first-in/first-out (FIFO) memory circuit; loading a second identifier corresponding to the second packet into the first FIFO memory circuit; loading a third identifier corresponding to the second packet into a second FIFO memory circuit; and loading a fourth identifier corresponding to the fourth packet into the first FIFO memory circuit. The fourth identifier is loaded into the first FIFO memory circuit before the first identifier is loaded into the first FIFO memory circuit.

Figure 1A:
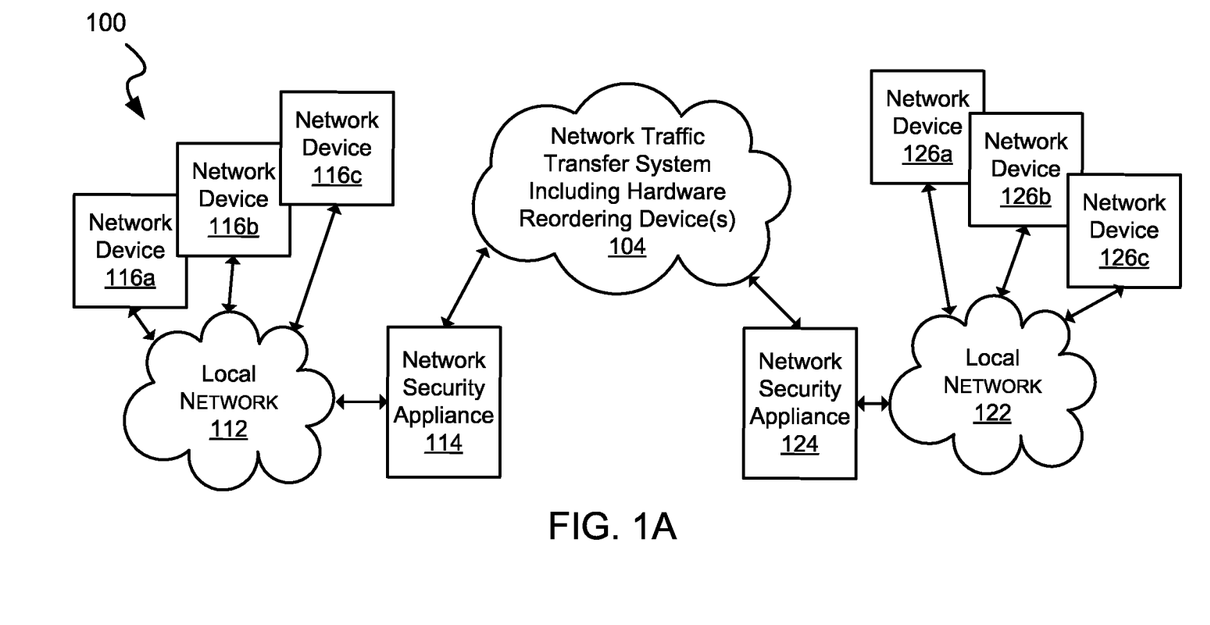
FIG. 1A-1B illustrates a network architecture including a network traffic transfer system having one or more hardware reordering devices in accordance with some embodiments.

Turning to FIG. 1A, network architecture 100 is shown that includes a network traffic transfer system 104 having one or more hardware reordering devices in accordance with some embodiments. Network traffic transfer system 104 receives network traffic from other network elements (e.g., network security appliance 114 and network security appliance 124), processes the network traffic, and forwards the network traffic to identified destinations. Thus, various network devices 116a, 116b, 116c, 126a, 126b, 126c may cause network traffic to transfer to/from other network devices via network traffic transfer system 104.

Network devices 116a, 116b, 116c, 126a, 126b, 126c may be any device that is capable of communicating via a communication network. As just some examples, network devices 116a, 116b, 116c, 126a, 126b, 126c may be a smart phone, tablet device, server, personal computer, or the like. Based upon the disclosure provided herein, one of ordinary skill in the art will recognize a number of network devices that may be used in relation to different embodiments.

As an example, network device 116a may transmit a communication to network device 126c. In such an example, network traffic from network device 116a is transferred via a local network 112 to network security appliance 114. In turn, network security appliance 114 transfers the network traffic to network security appliance 124 via network traffic transfer system 104. Network traffic transfer system 104 transfers the network traffic to network security appliance 124, and network security appliance 124 transfers the network traffic to the destination, network device 126c, via a local network 122.

Local network 112 and local network 122 may respectively be any type of communication network known in the art. Those skilled in the art will appreciate that, local network 112 and local network 122 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Access to local network 112 is controlled by network security appliance 114, and access to local network 122 is controlled by network security appliance 124.

In some cases a multicast transfer may be performed. As an example, network device 116a may transmit the same communication to all of network device 126a, network device 126b, and network device 126c. In such an example, network traffic from network device 116a is transferred via a local network 112 to network security appliance 114. In turn, network security appliance 114 transfers the network traffic to network security appliance 124 via network traffic transfer system 104. Network traffic transfer system 104 transmits the network traffic separately to the three destinations network device 126a, network device 126b, and network device 126d via network security appliance 124 and local network 122.

Figure 2:
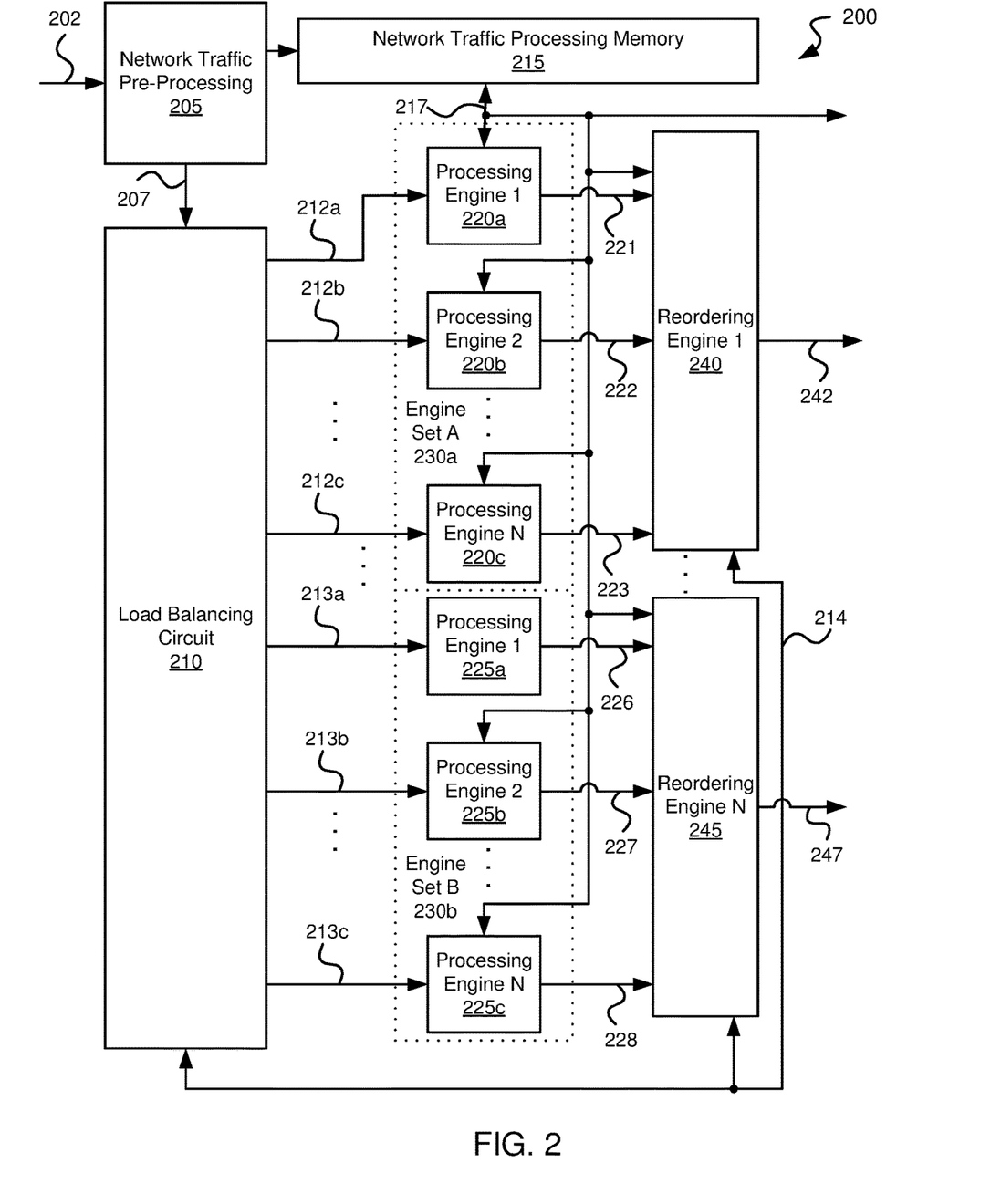
FIG. 2 is a block diagram of a network transfer system having at least two reordering engines in accordance with various embodiments.
Figure 3:
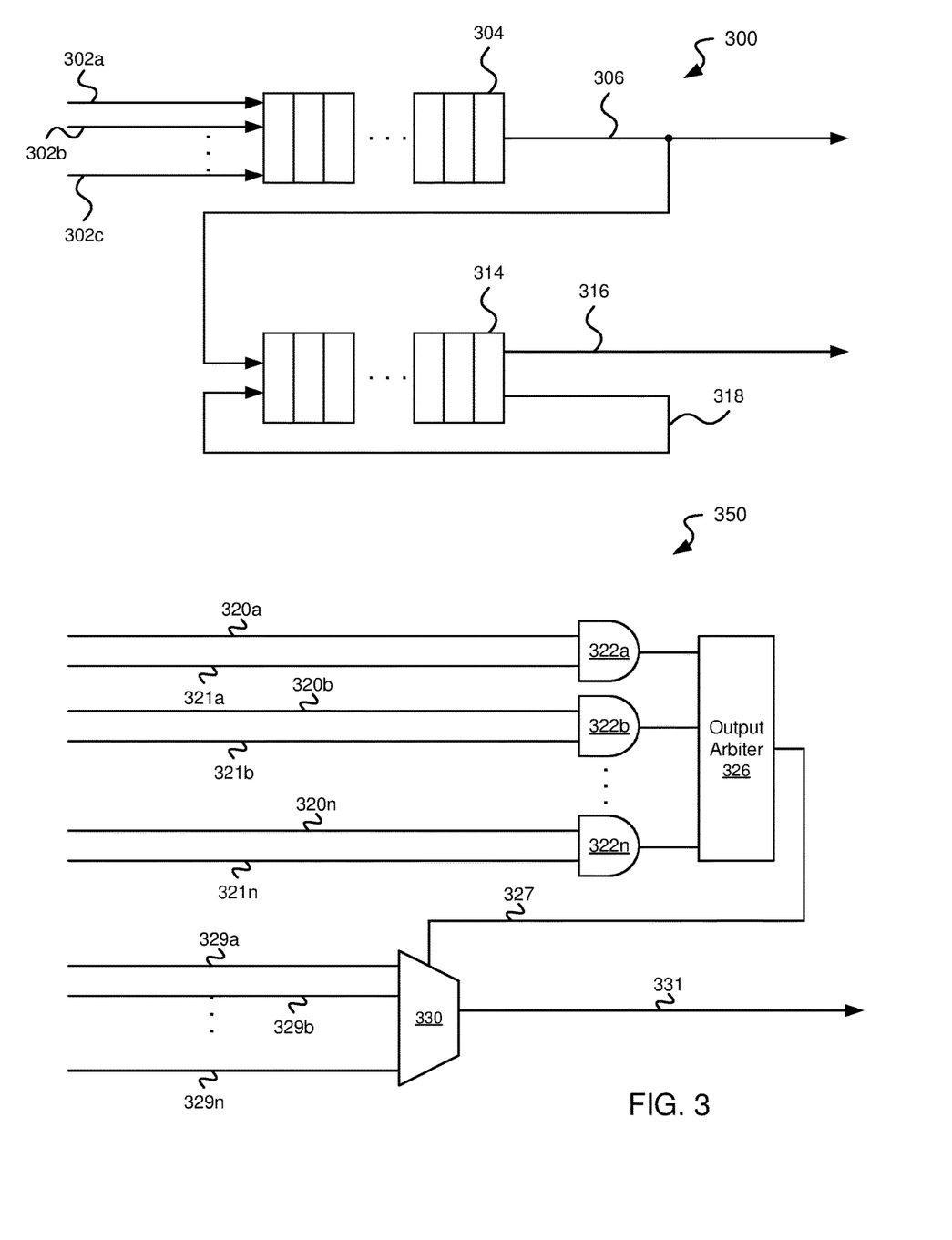
FIG. 3 shows a reordering engine circuit that may be used as one or more of reordering engines of FIG. 2 in accordance with some embodiments.
Figure 4A:
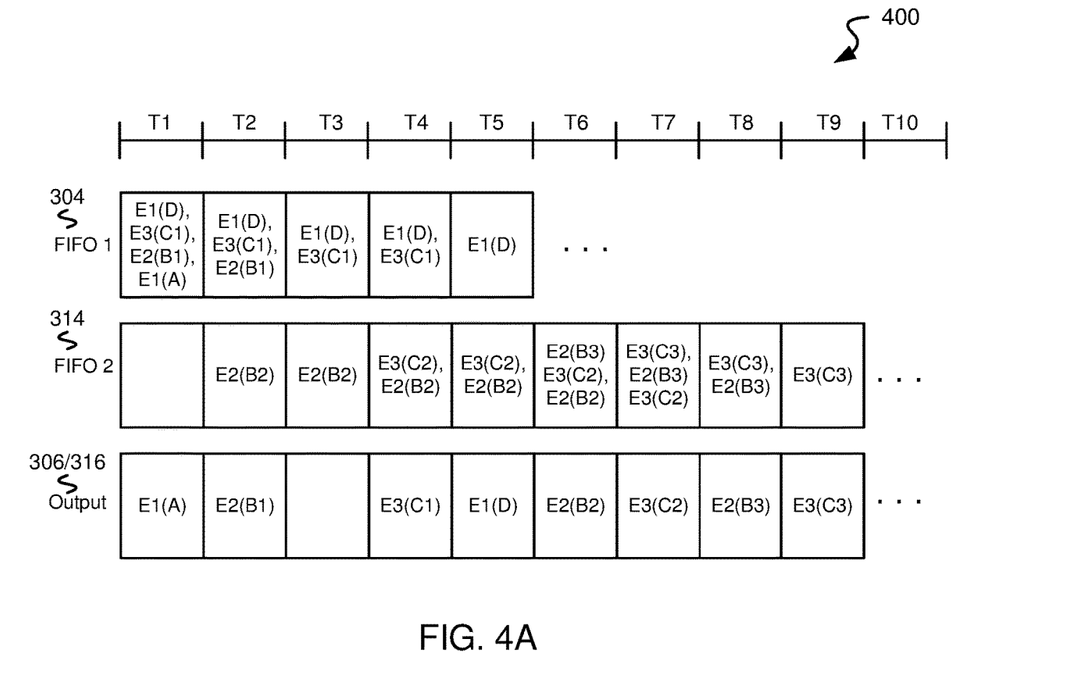
FIGS. 4A-4B are timing diagrams showing different example operations of the network transfer system of FIG. 2 including a reordering engine circuit of FIG. 3.
Figure 4B:
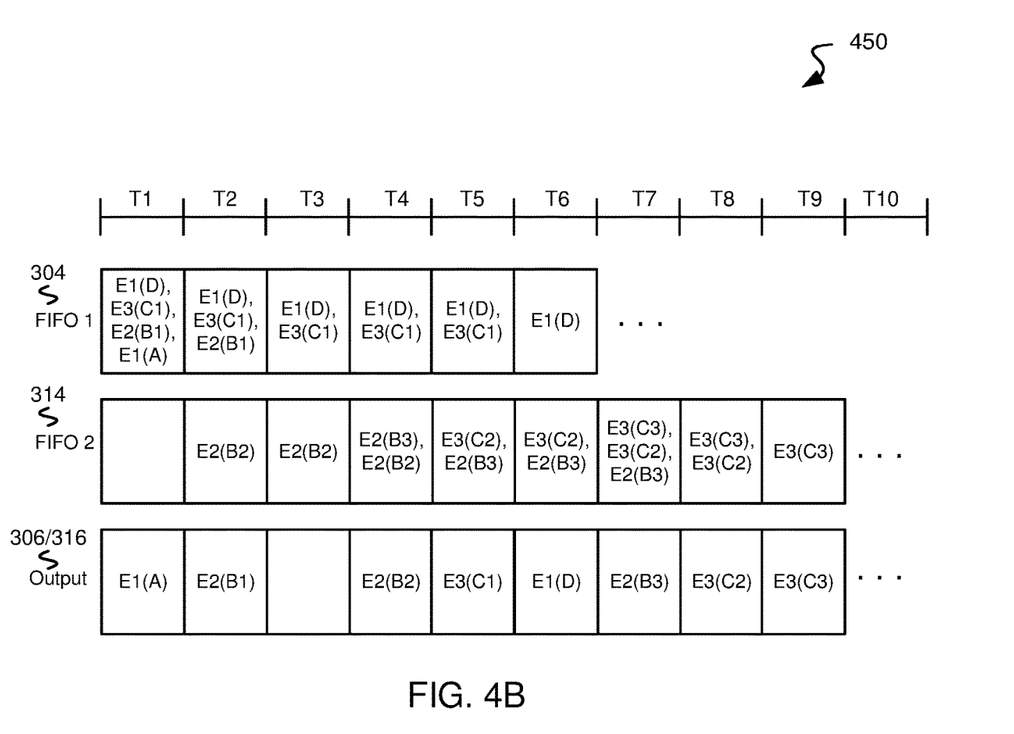

In both the multicast and single cast scenarios, the transferred network traffic is received and processed, along with other concurrent network traffic from other sources, by network traffic transfer system 104. Network traffic transfer system 104 relies upon one or more first-in/first-out (FIFO) pairs where a first FIFO of each of the FIFO pairs stores original packet order informed by control signals from a load balancing circuit. The second FIFO of each of the FIFO pairs stores original packet order for multicast packets. Thus, the first FIFO maintains the appropriate order for unicast packets simply by virtue of using its FIFO ordering, and a combination of the first and second FIFOs maintains the appropriate order for multicast packets by virtue of using its combined FIFO ordering. Example embodiments of circuits and corresponding timing diagrams are shown in FIGS. 2-4 below.

Figure 1B:
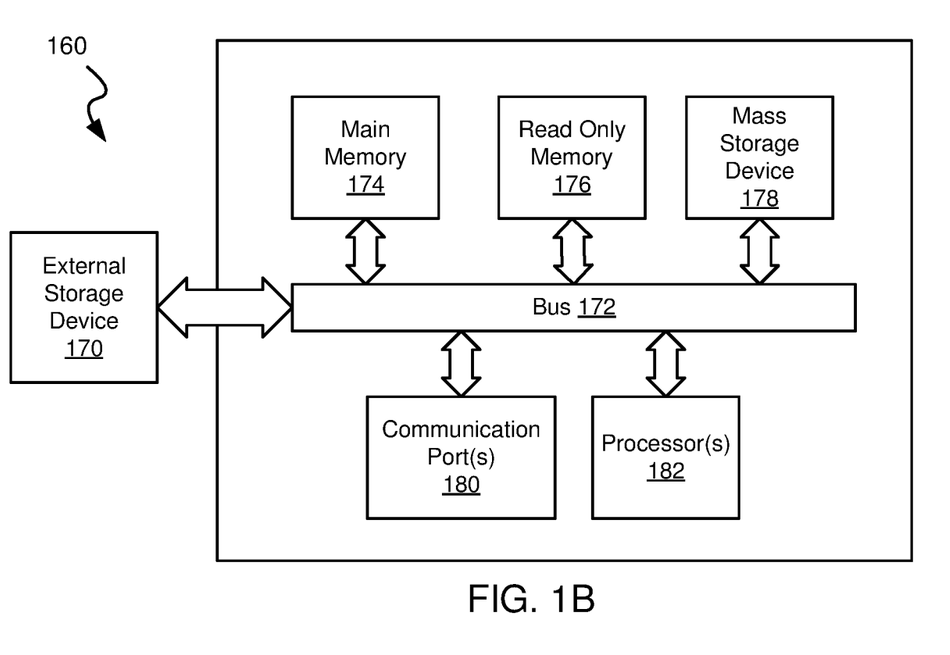

Turning to FIG. 1B, an example computer system 160 is shown in which or with which part or all of network transfer system 104 may be deployed. As shown in FIG. 1B, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network traffic transfer system 104.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

FIG. 2 is a block diagram of a network transfer system 200 having at least two reordering engines 240, 245 is shown in accordance with various embodiments. In some embodiments, network transfer system 200 may be deployed as part of network transfer system 104. Network transfer system 200 includes a network traffic pre-processing module 205, a load balancing circuit 210, at least one processing engine set (e.g., processing engine set 230a and/or processing engine set 230b), a network processing memory 215, and a reordering engine for each of the processing engine sets (e.g., reordering engine 240 for processing engine set 230a and reordering engine 245 for processing engine set 230b). Each of processing engine sets 230 includes two or more parallel processing engines (e.g., processing engine 220a, processing engine 220b, and/or processing engine 220c in processing engine set 230a; and processing engine 225a, processing engine 225b, and/or processing engine 225c in processing engine set 230b).

Network traffic pre-processing module 205 receives network traffic 202 and saves the received network traffic to network traffic processing memory 215. In addition, network traffic pre-processing module 205 generates a network traffic descriptor 207 that describes network traffic 202. In some embodiments, network traffic descriptor 207 includes: (a) a source of network traffic 202 including both source address IP address and port number, (b) a destination of network traffic 202 including both destination address IP address and port number, (c) protocol of network traffic 202, and (d) address of network traffic 202 in network traffic processing memory 215. All of the aforementioned information is included in network traffic 202, and network traffic pre-processing module 205 merely accesses the respective information from network traffic 202 and assembles it as network traffic descriptor 207. Network traffic descriptor 207 is provided to load balancing circuit 210. In some embodiments, network traffic pre-processing module 205 is implemented as a custom hardware circuit. In other embodiments, network traffic pre-processing module 205 is implemented as a processor and computer readable medium with the computer readable medium including instructions executable by the processor to perform the functions of network traffic pre-processing module 205.

Load balancing circuit 210 distributes respective network traffic descriptors 207 corresponding to different instances of network traffic 202 to selected ones of processing engines 220, 225 with the purpose of maximizing throughput of network transfer system 200 by assuring that all of processing engines 220, 225 are utilized in a balanced manner. As an example, when processing engine 220a is coming available and is next to accept a load, a newly received network traffic descriptor 207 is provided to processing engine 220a as an engine load 212a. Similarly, when processing engine 220b is coming available and is next to accept a load, a newly received network traffic descriptor 207 is provided to processing engine 220b as an engine load 212b; when processing engine 220c is coming available and is next to accept a load, a newly received network traffic descriptor 207 is provided to processing engine 220c as an engine load 212c; when processing engine 225a is coming available and is next to accept a load, a newly received network traffic descriptor 207 is provided to processing engine 225a as an engine load 213a; when processing engine 225b is coming available and is next to accept a load, a newly received network traffic descriptor 207 is provided to processing engine 225b as an engine load 213b; and when processing engine 225c is coming available and is next to accept a load, a newly received network traffic descriptor 207 is provided to processing engine 225c as an engine load 213c.

Any algorithm known in the art for distributing a load across multiple parallel processing engines may be used in implementing load balancing circuit 210. In some embodiments load balancing circuit is implemented as a circuit specifically configured to perform the previously described load balancing processes. In various embodiments, load balancing circuit may be replaced by a load balancing module implemented as a processor and computer readable medium with the computer readable medium including instructions executable by the processor to perform the functions of load balancing circuit 210. To allow for parallel processing of ordering processes, packets provided to engine set 230a and reordering engine 240 are not dependent upon packets provided to engine set 230b and reordering engine 245. The following is an example: the combination of engine set 230a and reordering engine 240 receive packets identified with flow identifications of 1, 2, and 3; while the combination of engine set 230b and reordering engine 245 receive packets identified with flow identifications of 4, 5, and 6. In this example, the order of packets identified with flow identifications of 1, 2, and 3 is not dependent upon the order of packets identified with flow identifications of 4, 5, and 6. As such, reordering of packets identified with flow identifications of 4, 5, and 6 can be performed without concern for how the reordering of packets identified with flow identifications of 1, 2, and 3 is processing.

Additionally, load balancing circuit 210 generates control signals 214 that are provided to reordering engines 240, 245. Such control signals 214 include an indication of an order in which network traffic 202 is loaded into the respective processing engines within engine sets 230. Control signals 214 are further discussed below in relation to FIG. 3. In some embodiments, load balancing circuit 210 is implemented as an ASIC. In other embodiments, load balancing circuit 210 is implemented as a processor and computer readable medium with the computer readable medium including instructions executable by the processor to perform the functions of load balancing circuit 210.

In some embodiments, each of processing engines 220, 225 are identical such that they are expected to perform the identical function as any other processing engine in about the same amount of time. Such an approach of using identical processing engines makes the processes of load balancing circuit 210 less complex as it can treat all engines the same. In other embodiments, one or more of processing engines 220, 225 are different and tailored to make processing a particular input more efficient. In such cases, load balancing circuit 210 is modified to identify network traffic descriptors 207 for which a particular processing engine may be more efficient, and to load the processing engines accordingly. All further discussion in this application assumes the former where all of the processing engines are identical. Reordering can become very important when processing time of one packer varies significantly from that of another packet in the same ordering flow.

Processing engines 220, 225 are each configured to perform various processes on network traffic 202 accessed from network traffic processing memory 215 via a memory bus 217. A respective processing engine accesses a network traffic 202 from network traffic processing memory 215 using the address of the network traffic supplied as part of an engine load 212, 213. The processing performed may be any processing known in the art that is to be applied to network traffic that is being transferred by a network traffic transfer system.

As a processing engine 220, 225 completes its processing, a reordering engine (e.g., one of reordering engine 240 or reordering engine 245) corresponding to the engine set (e.g., one of engine set 230a or engine set 230b) that includes the respective processing engine stores an engine complete data set (i.e., one of engine complete data set 221, engine complete data set 222, engine complete data set 223, engine complete data set 226, engine complete data set 227, or engine complete data set 228). The engine complete data set includes at least: the address of the network traffic that was processed by the respective processing engine where the address designates a location in network traffic processing memory 215 where the processed network traffic can be accessed, an indication of whether the current packet is part of a multi-cast, and an indication of whether the current packet is the last packet in a multi-cast.

In turn the reordering engine applies a reordering algorithm to a number of received engine complete data sets to order the network traffic processed by processing engines with the engine set associated with the respective reordering engine are in the same order that the corresponding network traffic was received by network traffic pre-processing module 205. One implementation of a reordering engine is discussed below in relation to FIGS. 3-4. The reordered engine complete data sets are used to access corresponding data from network processing memory 215, assemble corresponding network traffic, and provide the corresponding network traffic as a network traffic output 242, 247. Various control signals 214 are provided between load balancing circuit 210 and respective reordering engines 240, 245 to facilitate reordering and output of reordered network traffic. Such control signals 214 are addressed in more detail in relation to FIG. 3 below.

Turning to FIG. 3, a reordering engine circuit 300 is shown that may be used in place of each of reordering engine 240 and/or reordering engine 245 of FIG. 2 in accordance with some embodiments. Reordering engine circuit 300 includes a first FIFO memory 304 and a second FIFO memory 314 that are used together to perform reorganizing of network traffic. In particular, first FIFO memory 304 and second FIFO memory 314 are used to providing ordering of network traffic processed through a given engine set (e.g. one of engine sets 230 of FIG. 2). The ordering of network traffic operates to restore original packet order (e.g., the order in which network traffic 202 of FIG. 2 is received) and enables interleaved dispatch of packets in multicast sequence to maximize utilization of processing engines (e.g., processing engines 220 or processing engines 225 of the engine set being served by the FIFOs).

First FIFO 304 stores original packet order informed by control signals 214 from load balancing circuit 210. In particular, a thread identification input 302 (i.e., thread identification 302a, thread identification 302b, and thread identification 302c) are provided as inputs to first FIFO 304. Thread identification 302a indicates the order of a particular data set in network traffic processing memory 215 and is logically ANDed with an allocate signal that is asserted when first FIFO 304 is to be loaded. The allocate signal is included as part of control signals 214 (shown in FIG. 2) and the flow indication is received as part of an engine complete data set (e.g., engine compete data set 221 shown in FIG. 2). Similarly, thread identification 302b indicates the order of a particular data set in network traffic processing memory 215 and is logically ANDed with the allocate signal that is asserted when first FIFO 304 is to be loaded where the flow indication is received as part of an engine complete data set (e.g., engine compete data set 222 shown in FIG. 2); and thread identification 302c indicates the order of a particular data set in network traffic processing memory 215 and is logically ANDed with the allocate signal that is asserted when first FIFO 304 is to be loaded where the flow indication is received as part of an engine complete data set (e.g., engine compete data set 222 shown in FIG. 2).

The allocate signal for only one processing engine is asserted at any given time and asserted in the order that the processing engines are loaded. As such first FIFO 304 is only loaded with one thread identification at a time, and the order that the thread identifications are loaded is the same as the order originally dispatched to processing engines (e.g., processing engines 220) by load balancing circuit 210. The thread identifications stored in first FIFO 304 are provided as an output 306 whenever the thread identification corresponds to a non-multicast packet or the thread identification corresponds to the last packet of a multicast packet. The status as either a non-multicast packet or the last packet of a multicast packet is indicated by one or more signals provided as part of engine complete data sets 221, 222, 223, 226, 227, 228 shown in FIG. 2 from particular processing engine providing the output.

Second FIFO 314 stores original packet order for multicast packets. In particular, an output from first FIFO 304 is loaded to second FIFO 314 whenever the output from first FIFO 304 is a thread identification corresponding to a multicast packet that is not the last multicast packet. The thread identifications stored in second FIFO 314 are provided as an output 316 whenever the output is a last packet of a multicast network traffic. The thread identifications stored in second FIFO 314 are provided as an input 318 fed back into second FIFO 314 whenever the output is not a last packet of a multicast network traffic. The status of a data set corresponding to a given thread identification as either a non-multicast packet or the last packet of a multicast packet is provided by a given processing engine (e.g., one of processing engines 220, 225) and is provides as part of a respective one of engine complete data sets 221, 222, 223, 226, 227, 228 from the particular processing engine as shown in FIG. 2.

Each time a thread identification is provided from one of output 306, output 316, or output 318, an output descriptor 331 is provided that corresponds to the particular thread identification. In some embodiments, output descriptor 331 includes: (a) a source of network traffic 202 (shown in FIG. 2) including both source address IP address and port number, (b) a destination of network traffic 202 (shown in FIG. 2) including both destination address IP address and port number, (c) protocol of network traffic 202, and (d) address of network traffic 202 (shown in FIG. 2) in network traffic processing memory 215 (shown in FIG. 2). Output descriptor 331 is generated by an output descriptor circuit 350 that is a subset of reordering engine circuit 300.

Output descriptor circuit 350 includes logic that selects one of a number of descriptors 329a, 329b, 329c as output descriptor 331. Descriptors 329a, 329b, 329c are each instances of network traffic descriptors 207 (shown in FIG. 2) that describe network traffic being processed by respective processing engines and in some embodiments are included in engine complete data sets (e.g., engine complete data sets 221, 222, 223, 226, 227, 228 shown in FIG. 2) for the corresponding processing engine (e.g., processing engines 220, 230 shown in FIG. 2). As an example, descriptor 329a may indicate the network traffic being processed by processing engine 220a, descriptor 329b may indicate the network traffic being processed by processing engine 220b, and descriptor 329c may indicate the network traffic being processed by processing engine 220c.

Descriptor ready inputs 320a, 320b, 320c respectively indicate that a corresponding processing engine has completed processing of a network traffic packet and is ready to be unloaded. One of descriptor ready inputs is selected and forwarded to an output arbiter circuit 326. The selection is done by logically ANDing each of descriptors 320 with a corresponding selector input 321 (i.e., one of selector input 321a, selector input 321b, or a selector input 321c). Selector inputs 321 are a combination of information from output 306, output 316, and output 318 that are provided as first FIFO 306 and second FIFO 316 are respectively loaded/unloaded. In particular, selector input 321a is asserted such that descriptor ready input 320a is selected whenever a head thread identification in output 306 indicates a first processing engine (e.g., processing engine 220a of FIG. 2) or whenever a head thread identification in output 318 indicates the first processing engine. Similarly, descriptor ready input 320b is selected whenever a head thread identification in output 306 indicates an $n^{th}$ processing engine (e.g., processing engine 220c of FIG. 2) or whenever head a head thread identification in output 316 indicates the $n^{th}$ processing engine. None, one, or more than one selector input 321 may asserted at a given time, and as such none, one, or more than one of outputs from AND gates 322a, 322b, 322c may be asserted at any given time. As an example, when output 306 has a thread identification equal to '1' then selector input 321a is a '1'; and when output 316 has a thread identification equal to '2' then selector input 321b is a '1'. The selected descriptor is provided by output arbiter circuit 326 as a grant selector 327. Grant selector 327 is provided to a multiplexer circuit 330 that selects one of descriptors 329a, 329b, 329c as output descriptor 331. The output descriptor may be used along with corresponding processed network traffic in network traffic processing memory 215 to yield processing network traffic to be forwarded to an indicated destination.

Turning to FIG. 4A, a timing diagram 400 shows an example operation of the network transfer system 200 of FIG. 2 using reordering engine circuit 300 of FIG. 3. In timing diagram 400 a number of network traffic packets are processed. The network traffic packets are designated A and D which are each unicast or non-multicast packets; B1, B2, B3 which are multicasts of the same packets; and C1, C2, C3 which are multicasts of the same packets. Packets D, A are assigned to processing engine 1; packets B3, B2, B1 are assigned to processing engine 2; and packets C3, C2, C1 are assigned to processing engine 3. Timing diagram 400 shows a first scenario where two processed packets E3 (C1) and E2 (B2) become available for output at the same time (i.e., T3) and either could be output. In this first scenario output arbiter 326 selects engine E3 over engine E2. Of note, the destination of the unicast transmissions (A, D) receives A followed by D, and the destinations of the multicast (1, 2, 3) each receive B followed by C which are the orders to be preserved.

The aforementioned packets are received as network traffic 202 (shown in FIG. 2) and loaded into respective processing engines 220 (shown in FIG. 2) in the following order: A, B1, C1, D, B2, C2, B3, C3. Processing engine 220a is initially loaded by load balancing circuit 210 with packet A (designated as E1(A)), and in parallel or within some short time processing engine 220b is loaded by load balancing circuit 210 with packet B1 (designated as E2(B1)), and processing engine 220c is loaded by load balancing circuit 210 with packet C1 (designated as E3(C1)). Once processing of A is completed by processing engine 220a and E1(A) is unloaded from the processing engine, processing engine 220a signals it is free and is loaded by load balancing circuit 210 with packet D (designated as E1(D)).

First FIFO 304 and second FIFO 314 determine which engine (processing engine E1, E2, E3 from an engine set) is eligible to provide an output once processing is completed. After the eligible engine designated by the combination of first FIFO 304 and second FIFO 314, output arbiter circuit 326 selects one of the designated engines for output. When the designated engine selected by output arbiter circuit 326 completes the output, the first FIFO 304 or second FIFO 314 that held the thread identification identifying the engine is unloaded. Using this example as more fully discussed below in relation to time period T4, where E2(B2) is identified by the E2 processing engine as part of a multicast series and not the last in the multicast series, and E2(B2) is designated as eligible for output by the combination of first FIFO 304 and second FIFO 314, and output arbiter circuit 326 selects B2 to be provided as an output, the following three events occur concurrently:

(a) B2 is unloaded from engine E2 and provided as an output;
(b) E2(B2) is unloaded from second FIFO 314; and
(c) Second FIFO 314 is loaded with E2(B3), and E2 continues to process B3 after B2 is unloaded.

The same processing engine (e.g., one of E1 or E2) processes the entire multi-cast sequence of a given packet.

The loading of processing engines 220a, 220b, 220c is mirrored in first FIFO 304 and second FIFO 314 such that FIFO 304 is loaded with thread identifiers for E1(A), E2(B1), and E3(C1). The combination of first FIFO 304 and second FIFO 314 designate only E1(A) as eligible for output upon completion of processing engine E1, and output arbiter circuit 326 selects E1(A) to output A when completed. As processing engine E1 completes processing of A, A is provided as an output, E1(A) is unloaded from first FIFO 304, and E1(D) is loaded into FIFO 304 because it is a unicast packet. At this juncture processing engine E1 begins processing D and E1(D) proceeds up first FIFO 304 until it is designated for output.

At time T2, with E1(A) having been unloaded from first FIFO 304, the combination of first FIFO 304 and second FIFO 314 designate only E2(B1) as eligible for output upon completion of processing engine E2, and output arbiter circuit 326 selects E2(B1) to output B1 when completed. As processing engine E2 completes processing of B1, B1 is provided as an output, E2(B1) is unloaded from first FIFO 304, and E2(B2) is loaded into FIFO 314 because it is a second or later component of a multicast packet. At this juncture processing engine E2 begins processing B2 and E2(B2) proceeds up second FIFO 314 until it is designated for output.

At time T3, none of the processing engines (E1, E2, E3) have completed processing and thus neither of first FIFO 304 nor second FIFO 314 are either unloaded or loaded. The combination of first FIFO 304 and second FIFO 314 designate both E2(B2) and E3(C1) as eligible for output upon completion of their respective processing engine. All processing engines (E1, E2, E3) remain occupied and thus nothing is loaded into either first FIFO 304 or second FIFO 314.

At time T4, both processing engine E3 and processing engine E2 have completed processing and both E2(B2) and E3(C1) are eligible for unloading from the respective processing engine. In this case, output arbiter circuit 326 could select either E2(B2) or E3(C1) and for this example scenario E3(C1) was selected and thus C1 is unloaded from processing engine E3 and provided as an output. In the same time period, E3(C2) is loaded into second FIFO 314 and processing engine E3 begins processing C2. Nothing remains to be loaded into first FIFO 304.

At time T5, processing engine E1 has completed processing and E1(D) is eligible for unloading. In this case, output arbiter circuit 326 selects E1(D) for unloading and providing as an output. Processing engines E2, E3 remain occupied and nothing remains to be processed by processing engine E1, and thus nothing is loaded into either first FIFO 304 or second FIFO 314

At time T6, processing engine E2 has completed processing and only E2(B2) is eligible for unloading from second FIFO 314 as nothing remains in first FIFO 304. In this case, output arbiter circuit 326 selects E2(B2) for unloading and providing as an output. In the same time period, E2(B3) is loaded into second FIFO 314 and processing engine E2 begins processing B3. Nothing remains to be loaded into first FIFO 304.

At time T7, E3(C3) is loaded from processing engine E3 into second FIFO 314. Further, processing engine E3 has completed processing and only E3(C2) is eligible for unloading from second FIFO 314 as nothing remains in first FIFO 304. In this case, output arbiter circuit 326 selects E3(C2) for unloading and providing as an output. Nothing remains to be loaded into either first FIFO 304 or second FIFO 314.

At time T8, processing engine E2 has completed processing and only E2(B3) is eligible for unloading from second FIFO 314 as nothing remains in first FIFO 304. In this case, output arbiter circuit 326 selects E2(B3) for unloading and providing as an output. Nothing remains to be loaded into either first FIFO 304 or second FIFO 314.

At time T9, processing engine E3 has completed processing and only E3(C3) is eligible for unloading from second FIFO 314 as nothing remains in first FIFO 304. In this case, output arbiter circuit 326 selects E3(C3) for unloading and providing as an output. Nothing remains to be loaded into either first FIFO 304 or second FIFO 314.

Turning to FIG. 4B, a timing diagram 450 shows an example operation of the network transfer system 200 of FIG. 2 using reordering engine circuit 300 of FIG. 3. In timing diagram 450 a number of network traffic packets are processed. The network traffic packets are designated A and D which are each unicast or non-multicast packets; B1, B2, B3 which are multicasts of the same packets; and C1, C2, C3 which are multicasts of the same packets. Packets D, A are assigned to processing engine 1; packets B3, B2, B1 are assigned to processing engine 2; and packets C3, C2, C1 are assigned to processing engine 3. Timing diagram 450 shows a second scenario where the same two processed packets (i.e., E3 (C1) and E2 (B2)) as in timing diagram 400 of FIG. 4A become available for output at the same time and either could be output. In this second scenario output arbiter 326 selects engine E2 over engine E3. Of note, similar to that discussed in relation to timing diagram 400 of FIG. 4A, the destination of the unicast transmissions (A, D) receives A followed by D, and the destinations of the multicast (1, 2, 3) each receive B followed by C which are the orders to be preserved.

The aforementioned packets are received as network traffic 202 (shown in FIG. 2) and loaded into respective processing engines 220 (shown in FIG. 2) in the following order: A, B1, C1, D, B2, C2, B3, C3. Processing engine 220a is initially loaded by load balancing circuit 210 with packet A (designated as E1(A)), and in parallel or within some short time processing engine 220b is loaded by load balancing circuit 210 with packet B1 (designated as E2(B1)), and processing engine 220c is loaded by load balancing circuit 210 with packet C1 (designated as E3(C1)). Once processing of A is completed by processing engine 220a and E1(A) is unloaded from the processing engine, processing engine 220a signals it is free and is loaded by load balancing circuit 210 with packet D (designated as E1(D)).

The loading of processing engines 220a, 220b, 220c is mirrored in first FIFO 304 and second FIFO 314 such that FIFO 304 is loaded with thread identifiers for E1(A), E2(B1), and E3(C1). The combination of first FIFO 304 and second FIFO 314 designate only E1(A) as eligible for output upon completion of processing engine E1, and output arbiter circuit 326 selects E1(A) to output A when completed. As processing engine E1 completes processing of A, A is provided as an output, E1(A) is unloaded from first FIFO 304, and E1(D) is loaded into FIFO 304 because it is a unicast packet. At this juncture processing engine E1 begins processing D and E1(D) proceeds up first FIFO 304 until it is designated for output.

At time T2, with E1(A) having been unloaded from first FIFO 304, the combination of first FIFO 304 and second FIFO 314 designate only E2(B1) as eligible for output upon completion of processing engine E2, and output arbiter circuit 326 selects E2(B1) to output B1 when completed. As processing engine E2 completes processing of B1, B1 is provided as an output, E2(B1) is unloaded from first FIFO 304, and E2(B2) is loaded into FIFO 314 because it is a second or later component of a multicast packet. At this juncture processing engine E2 begins processing B2 and E2(B2) proceeds up second FIFO 314 until it is designated for output.

At time T3, none of the processing engines (E1, E2, E3) have completed processing and thus neither of first FIFO 304 nor second FIFO 314 are either unloaded or loaded. The combination of first FIFO 304 and second FIFO 314 designate both E2(B2) and E3(C1) as eligible for output upon completion of their respective processing engine. All processing engines (E1, E2, E3) remain occupied and thus nothing is loaded into either first FIFO 304 or second FIFO 314.

At time T4, both processing engine E3 and processing engine E2 have completed processing and both E2(B2) and E3(C1) are eligible for unloading from the respective processing engine. In this case, output arbiter circuit 326 could select either E2(B2) or E3(C1) and for this example scenario E2(B2) was selected and thus B2 is unloaded from processing engine E2 and provided as an output. In the same time period, E2(B3) is loaded into second FIFO 314 and processing engine E2 begins processing B3. Nothing remains to be loaded into first FIFO 304.

At time T5, E3(C1) and E2(B3) are eligible for unloading. In this case, output arbiter circuit 326 selects E3(C1) for unloading and providing as an output. In the same time period, the now available processing engine E3 is loaded with C2 and E3(C2) is loaded into second FIFO 314

At time T6, E1(D) and E2(B3) are eligible for unloading. In this case, output arbiter circuit 326 selects E1(D) for unloading and providing as an output. Nothing remains to be loaded into first FIFO 304. Further, both processing engines E2, E3 are still loaded, and thus nothing is loaded into second FIFO 314.

At time T7, processing engine E2 has completed processing and only E2(B3) is eligible for unloading from second FIFO 314 as nothing remains in first FIFO 304. In this case, output arbiter circuit 326 selects E2(B3) for unloading and providing as an output. Nothing remains to be loaded into first FIFO 304. Further, none of the B series multicast remain to be loaded and the processing engine E3 remains occupied with C2 and thus nothing is loaded into second FIFO 314.

At time T8, processing engine E3 has completed processing and only E3(C2) is eligible for unloading from second FIFO 314 as nothing remains in first FIFO 304. In this case, output arbiter circuit 326 selects E3(C2) for unloading and providing as an output. During the same time period, newly available processing engine E3 is loaded with C3 and E3(C3) is loaded into second FIFO 314.

At time T9, processing engine E3 has completed processing and only E3(C3) is eligible for unloading from second FIFO 314 as nothing remains in first FIFO 304. In this case, output arbiter circuit 326 selects E3(C3) for unloading and providing as an output. Nothing remains to be loaded into either first FIFO 304 or second FIFO 314.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for transferring network traffic, the system comprising:
   a first first-in/first-out (FIFO) memory circuit;
   a second FIFO memory circuit;
   a controller;
   a first processing engine;
   a second processing engine; and
   wherein the controller is configured to designate the first processing engine for processing a first series of network traffic packets and designating the second processing engine for processing a second series of network traffic packets; wherein the first series of network traffic packets are unicast packets and the second series of network traffic packets are multicast traffic packets; and wherein:
   a first identifier of one of the first series of network traffic packets is loaded into the first FIFO memory circuit,
   a second identifier of another one of the first series of network traffic packets is loaded into the first FIFO memory circuit after the first identifier, wherein the one of the first series of network traffic packets corresponding to the first identifier is designated for processing by the first processing engine before the one of the first series of network traffic packets corresponding to the second identifier is designated for processing by the first processing engine;
   a third identifier of one of the second series of network traffic packets is loaded into the first FIFO memory circuit; and
   a fourth identifier of another one of the second series of network traffic packets is loaded into the second FIFO memory circuit, wherein the one of the second series of network traffic packets corresponding to the third identifier is designated for processing by the second processing engine before the one of the first series of network traffic packets corresponding to the fourth identifier is designated for processing by the second processing engine.

2. The system of claim 1, wherein the system further comprises:
   an output module, wherein the output module is configured to output any of the second series of network traffic packets with an identifier in the first FIFO memory circuit before outputting any other of the second series of network traffic packets with an identifier in the second FIFO memory circuit.

3. The system of claim 2, wherein the output module is an application specific integrated circuit.

4. The system of claim 2, wherein all of the output module, the first FIFO memory circuit, the second FIFO memory circuit, the first processing engine, the second processing engine, and the controller are implemented in the same application specific integrated circuit.

5. The system of claim 1, the system further comprising:
   a third processing engine, wherein the controller is configured to designate the third processing engine for processing the second series of network traffic packets; and wherein:
   a fifth identifier of one of the second series of network traffic packets designated for processing by the third processing engine is loaded into the first FIFO memory circuit; and
   a sixth identifier of another one of the second series of network traffic packets designated for processing by the third processing engine is loaded into the second FIFO memory circuit, wherein the one of the second series of network traffic packets corresponding to the fifth identifier is designated for processing by the third processing engine before the one of the second series of network traffic packets corresponding to the sixth identifier is designated for processing by the third processing engine.

6. The system of claim 5, wherein the system further comprises:
   an output module, wherein:
   the output module is configured to output the network traffic packet corresponding to the third identifier in the first FIFO memory circuit before outputting the network traffic packet corresponding to the fourth identifier in the second FIFO memory circuit; and the output module is configured to output the network traffic packet corresponding to the fifth identifier in the first FIFO memory circuit before outputting the network traffic packet corresponding to the sixth identifier in the second FIFO memory circuit.

7. The system of claim 6, wherein the output module is configured to output the network traffic packet corresponding to the fourth identifier in the second FIFO memory circuit before outputting the network traffic packet corresponding to the fifth identifier in the first FIFO memory circuit.

8. The system of claim 6, wherein the output module is configured to output the network traffic packet corresponding to the fifth identifier in the first FIFO memory circuit before outputting the network traffic packet corresponding to the fourth identifier in the second FIFO memory circuit.

9. The system of claim 1, wherein all of the first FIFO memory circuit, the second FIFO memory circuit, the first processing engine, and the second processing engine are implemented in the same application specific integrated circuit.

10. The system of claim 1, wherein the controller is implemented as one or more general purpose processors and a non-transitory computer readable medium, wherein the non-transient non-transitory computer readable medium includes instructions executable by the one or more general purpose processors to: designate the first processing engine for processing a first series of network traffic packets and designate the second processing engine for processing a second series of network traffic packets.

11. The system of claim 1, wherein the controller is a load balancer, and wherein the load balancer operates to balance loads performed by at least the first processing engine and the second processing engines.

12. A system for transferring network traffic, the system comprising:
a reordering engine circuit;
a first processing engine;
a second processing engine; and
a controller means for designating the first processing engine for processing a first series of network traffic packets and designating the second processing engine for processing a second series of network traffic packets, wherein the first series of network traffic packets are unicast packets and the second series of network traffic packets are multicast traffic packets; and wherein:
a first identifier of one of the first series of network traffic packets is loaded into a first FIFO of the reordering engine circuit,
a second identifier of another one of the first series of network traffic packets is loaded into the first FIFO after the first identifier, wherein the one of the first series of network traffic packets corresponding to the first identifier is designated for processing by the first processing engine before the one of the first series of network traffic packets corresponding to the second identifier is designated for processing by the first processing engine;
a third identifier of one of the second series of network traffic packets is loaded into the first FIFO; and
a fourth identifier of another one of the second series of network traffic packets is loaded into a second FIFO of the reordering engine circuit, wherein the one of the second series of network traffic packets corresponding to the third identifier is designated for processing by the second processing engine before the one of the first series of network traffic packets corresponding to the fourth identifier is designated for processing by the second processing engine.

13. The system of claim 12, wherein the system further comprises an output module, wherein the output module is configured to output any of the second series of network traffic packets with an identifier in the first FIFO before outputting any other of the second series of network traffic packets with an identifier in the second FIFO.

14. The system of claim 13, wherein the output module comprises an application specific integrated circuit.

15. The system of claim 13, wherein all of the output module, the reordering engine circuit, the first processing engine, the second processing engine, and the controller means are implemented in a single application specific integrated circuit.

16. The system of claim 12, the system further comprising:
a third processing engine, wherein the controller is configured to designate the third processing engine for processing the second series of network traffic packets; and wherein:
a fifth identifier of one of the second series of network traffic packets designated for processing by the third processing engine is loaded into the first FIFO; and
a sixth identifier of another one of the second series of network traffic packets designated for processing by the third processing engine is loaded into the second FIFO, wherein the one of the second series of network traffic packets corresponding to the fifth identifier is designated for processing by the third processing engine before the one of the second series of network traffic packets corresponding to the sixth identifier is designated for processing by the third processing engine.

17. The system of claim 16, wherein the system further comprises:
an output module, wherein:
the output module is configured to output the network traffic packet corresponding to the third identifier in the first FIFO before outputting the network traffic packet corresponding to the fourth identifier in the second FIFO; and
the output module is configured to output the network traffic packet corresponding to the fifth identifier in the first FIFO before outputting the network traffic packet corresponding to the sixth identifier in the second FIFO.

18. The system of claim 17, wherein the output module is configured to output the network traffic packet corresponding to the fifth identifier in the first FIFO before outputting the network traffic packet corresponding to the fourth identifier in the second FIFO.

19. The system of claim 12, wherein all of the first FIFO, the second FIFO, the first processing engine, and the second processing engine are implemented in a common application specific integrated circuit.

20. The system of claim 12, wherein the controller means is implemented as one or more general purpose processors and a non-transitory computer readable medium, wherein the non-transitory computer readable medium includes instructions executable by the one or more general purpose processors to: designate the first processing engine for processing a first series of network traffic packets and designate the second processing engine for processing a second series of network traffic packets.

* * * * *